(12) United States Patent
Kelly et al.

(10) Patent No.: US 8,055,547 B2
(45) Date of Patent: Nov. 8, 2011

(54) METHOD FOR SITE SELECTION FOR RETAIL AND RESTAURANT CHAINS

(75) Inventors: Thomas Kelly, Dade City, FL (US);
Nicholas M. Kiefer, Ithaca, NY (US);
Michael Lukianoff, Tampa, FL (US);
Alex Wohlhueter, Riverview, FL (US);
Iassena Stratieva, Tampa, FL (US)

(73) Assignee: Revenue Management Solutions, Inc., Tampa, FL (US)

( * ) Notice: Subject to any disclaimer, the term of this patent is extended or adjusted under 35 U.S.C. 154(b) by 395 days.

(21) Appl. No.: 10/972,400

(22) Filed: Oct. 26, 2004

(65) Prior Publication Data

US 2006/0009998 A1    Jan. 12, 2006

Related U.S. Application Data

(63) Continuation of application No. 10/887,923, filed on Jul. 12, 2004, now abandoned, which is a continuation of application No. 10/292,530, filed on Nov. 13, 2002.

(60) Provisional application No. 60/331,215, filed on Nov. 13, 2001.

(51) Int. Cl.
*G06Q 30/00* (2006.01)
(52) U.S. Cl. .................................................. 705/26.1
(58) Field of Classification Search .............. 705/10, 705/26, 27, 26.1
See application file for complete search history.

(56) References Cited

U.S. PATENT DOCUMENTS

| | | | |
|---|---|---|---|
| 4,930,011 A | 5/1990 | Kiewit | 358/84 |
| 5,446,919 A | 8/1995 | Wilkins | 455/6.2 |
| 5,521,813 A | 5/1996 | Fox et al. | 705/8 |
| 5,636,346 A | 6/1997 | Saxe | 395/201 |
| 5,724,521 A | 3/1998 | Dedrick | 395/226 |
| 5,848,396 A | 12/1998 | Gerace | 705/10 |
| 6,006,197 A | 12/1999 | d'Eon et al. | 705/10 |
| 6,009,409 A | 12/1999 | Adler et al. | 705/14 |
| 6,032,123 A | 2/2000 | Jameson | 705/8 |
| 6,044,357 A | 3/2000 | Garg | 705/10 |
| 6,061,660 A | 5/2000 | Eggleston et al. | 705/14 |
| 6,223,215 B1 | 4/2001 | Hunt et al. | 709/217 |
| 6,269,361 B1 | 7/2001 | Davis et al. | 707/3 |

(Continued)

FOREIGN PATENT DOCUMENTS

WO    WO02/44901 A2    6/2002

OTHER PUBLICATIONS

Shelly Reese, Bad mufflers make good data, Nov. 1998, American Demographics, vol. 20, Issue 11, pp. 1-2.*

(Continued)

*Primary Examiner* — Mila Airapetian
(74) *Attorney, Agent, or Firm* — Baker & Hostetler LLP

(57) ABSTRACT

A method of selecting a site for one or more retail units uses a database of information on existing units in a chain, including store sales or profits, site characteristics available from various databases, and information on marketing expenditure in the relevant market. Sales of potential new units are forecast abstracting from advertising efforts. Thus, potential profit characteristics of a site can be evaluated without regard to existing advertising programs. This corrects a major problem with existing approaches; site decisions can be made simultaneously with marketing allocation decisions.

10 Claims, 2 Drawing Sheets

U.S. PATENT DOCUMENTS

| | | | |
|---|---|---|---|
| 6,493,681 B1 | 12/2002 | Tertiski et al. .................. | 705/36 |
| 6,567,786 B1 | 5/2003 | Bibelnieks et al. ............. | 705/14 |
| 2002/0116348 A1 | 8/2002 | Phillips et al. ................ | 705/400 |
| 2003/0028417 A1 | 2/2003 | Fox ................................ | 705/10 |
| 2003/0078832 A1 | 4/2003 | Alvarez et al. .................. | 705/10 |

OTHER PUBLICATIONS

Michael S. Morgan, Assessing chain restaurant impact—using linear regression, Jun. 1995, Cornell Hotel and Restaurant Administration Quarterly, vol. 36, Issue 3, pp. 1-5.*

Robert L. Trewatha et al, A Multiple Branch Location Model: A Method to Analyze Site Selection Factors, Fall 1998, Akron Business and Economic Review, pp. 66-75.*

Howard L. Green, Good Site Analysts Know Where to Put a New Store, Sep. 11, 1987, Marketing News, vol. 21, Issue 19, p. 6.*

Dennis J. Lord and Charles D. Lynds, The Use of Regression Models in Store Location Research: A Review and Case Study, Summer 1981, Akron Business and Economic Review, vol. 12, Issue 2, p. 13.*

David S. Rogers, 5 Ways to Evaluate a Store Location, Sep. 1980, Discount Merchandiser, vol. 20, Issue 9, p. 42.*

Robert R. Bell and Noel B. Zabriskie, Assisting Marketing Decisions by Computer Mapping: A Branch Banking Application, Feb. 1978, Journal of Marketing Research, pp. 122-128.*

Ghosh, Avijit and Craig, C. Samuel. "Formulating Retail Location Strategy in a Changing Environment" Journal of Marketing. vol. 47 (Summer 1983). p. 56-68.*

"In Search of the Electronic Dummy"; Folio: The Magazine for Magazine Management. Stamford: Nov. 1, 1990. vol. 19, Iss. 11; p. 117, 3 pgs; http://proquest.umi.com/pqdweb?did=460276&sid=4&Fmt=2&clientId=19649&RQT=309&VName=PQD.*

The US retail demand for fish products: an application of the almost ideal demand system. Wellman, Katherine F., Applied Economics, v24, n4, p. 445(13), Apr. 1992.

Does TV advertisement really affect sales? The role of measures, models and data aggregation. Tellis, Gerald J.; Weiss, Doyle I., Journal of Advertising, v24, n3, pp. 1-12, Fall 1995.

Doyle et al., Optimal Growth Strategies for Service Organizations, The Journal of Business, vol. 56, No. 3, Jul. 1983, p. 389-405 [JSTOR].

Moutinho, et al., Comparative Computer Approaches to Multi-Outlet Retail Site Location Decisions, Service Industries Journal, vol. 13, No. 4, Oct. 1993, p. 202-220, [Diaglog: File 15].

Epstein, Site Selection Models for Retailers Not Just tor Site Selection Anymore, Shopping Center Business, Jul. 1999, EIC Internet Search.

Simmons, Site Attributes in Retail Leasing: An Analysis of a Fast-food Restaurant Market, The Appraisal Journal, Oct. 1992, [Google].

Gentry, Sites Unseen, Chains Store Age, Oct. 2000, p. 154-158 [Google].

Clarke, Changing Methods of Location Planning for Retail Companies, GeoJournal, Kluwer Academic Publishers, Aug. 31, 1998, p. 289-298 [Google].

Goodchild, ILACS: A Location-Allocation Model for Retail Site Selection, Journal of Retailing, vol. 60, No. 1, Spring 1984, p. 84-100, [EBSCO].

Tayman et al., Retail Site Selection and Geographic Information Systems, Journal of Applied Business Research, vol. 11, Issue 2, Spring 1995, starting p. 46 [EBSCO].

Morgan, Assessing Chain-Restaurant Impact—Using Linear Regression, Cornell Hotel and Restaurant Administration Quarterly, Cornell University, Jun. 1995, p. 30-33 [ProQuest].

Thrall et al., Retail Location Analysis with GIS: Seven Strategic Steps, Geo Info Systems, Nov. 1997, starting p. 42 [Dialog: File 16].

The Promotional Decision Process in Small Consumer-Oriented Retail and Service Firms: A Survey Analysis. Davis, Judy Foster, 1993, Michigan State University (0128).

Effective category (category management and marketing analysis) (Industry overview) (Statistical Data Included). Dhar et al., Journal of Retailing, v77, n2, p. 165, Summer 2001.

FRANSYS: A Franchise Distribution System Location Model, Journal of Retailing, vol. 67, No. 4, Winter 1991, Ghosh, et al.

Menu Pricing: An Experimental Approach. Nicholas M. Kiefer, et al., Journal of Business & Economic Statistics, vol. 12, No. 3, Jul. 1994.

A Demand-Based Approach to Menu Pricing, Thomas J. Kelly, et al.,The Cornell H.R.A. Quarterly, 1994.

Menu Pricing: An Experimental Approach, Thomas John Kelly, et al., COEX '93.

Price Recollection and Perceived Value in Restaurants, Nicholas M. Kiefer, et al., Food-Service Operations, Cornell University, 1995.

* cited by examiner

METHOD FOR SITE SELECTION FOR RETAIL AND RESTAURANT CHAINS

This application is a continuation of U.S. patent application Ser. No. 10/887,923, titled "Method for Site Selection for Retail and Restaurant Chains," filed on Jul. 12, 2004, now abandon which is a continuation of U.S. patent application Ser. No. 10/292,530, titled "Method for Site Selection for Retail and Restaurant Chains," filed Nov. 13, 2002, which claims priority to U.S. Provisional Patent Application No. 60/331,215, titled "Method for Site Selection for Retail Restaurant Chains," filed on Nov. 13, 2001.

FIELD OF THE INVENTION

The present invention is directed to a method for selecting a site for a store such as a retail unit or restaurant, and in particular, to a method that parcels out the effect of advertising so that pure characteristics of the site can be used to determine whether the site should be selected, and one that allows for site selection based on the level of advertising.

BACKGROUND ART

In the prior art, retail industry decision-making is becoming more sophisticated in nature, relying upon scientific methodologies and quantitative measures. Site selection is one of the most crucial decisions made in the retail chain (including especially restaurants) environment as it is capital intensive, has serious long term marketing implications, and is critical to corporate-franchisee relations. While there are a number of site selection tools in the prior art, the presently available tools forecast sales based on the sales of existing sites, and do not explicitly incorporate the effect of advertising into the site selection process. The problem with this approach is locating a new site in an area populated with other successful stores may not be solely related to site characteristics. A site selection finding that a geographic site has high predicted sales may be a result of high advertising expenditures at the similar sites used to generate the prediction. Consequently, putting a store at that site may only be successful if the same level of advertising is used. This flaw in prior art site selection tools is a result of the inability of the prior art tools to isolate the effects of advertising so that this effect can be removed from the site selection process.

Accordingly, a need exists to provide site selection tools that are capable of making site selection analyses without the effects of advertising skewing the site selection results. The present invention solves this need by providing a method which allows for site selection without the effects of advertising so that business owners have a more accurate picture of site characteristics without the effects of advertising.

SUMMARY OF THE INVENTION

It is a first object of the present invention to provide a method of site selection for retail units.

Another object of the invention is a method of site selection which parcels out advertising effects to better focus on other site characteristics for site selection purposes. Still another object of the invention is a method that is suitable for sites that include existing stores as well as sites that do not have stores.

One other objective is a model that "controls" statistically for advertising, allowing comparison of sites with the effects of advertising held constant. The model also allows "what if" sales forecasts with different hypothetical advertising allocations.

Other objects and advantages of the present invention will become apparent as a description thereof proceeds.

The primary objective of the inventive method described is to identify, with a high degree of certainty, whether or not a site is suitable for development, the volume of business that can be expected, and the general degree of profitability to be expected at the site. The associated site-selection method compiles and analyzes data and presents findings in a user-friendly manner, allowing the-user to adjust for "what if" conditions.

BRIEF DESCRIPTION OF THE DRAWINGS

Reference is now made to the drawings of the invention wherein.

DESCRIPTION OF THE PREFERRED EMBODIMENTS

Figure 1:
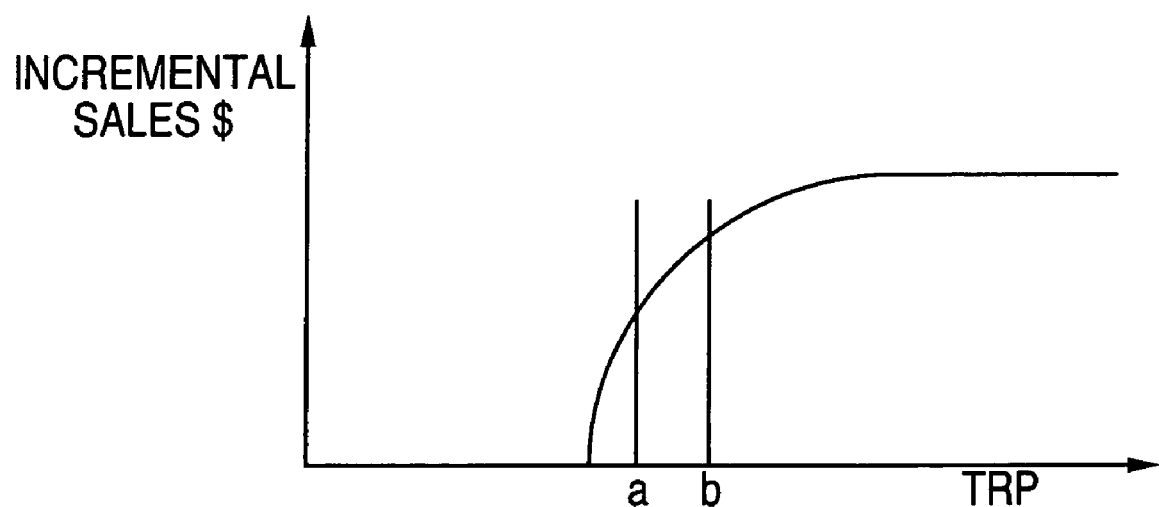
FIG. 1 is a graphical representation comparing target rating points to incremental sales.

The invention involves a number of steps in order to arrive at an output that informs the business owner whether a particular site is desirable for development. A first mode of the invention addresses situations where other stores exist in the site being investigated for further development. A second mode addresses the situation where there are no other stores in the site.

A first step in either mode is assembling of a database. The business owner or client supplies a sample of stores, or if possible the population of its stores, together with location information (latitude and longitude; these can be calculated from the address if necessary) and whatever store-specific information the system has. Often this includes store characteristics (size, model), and perhaps some local demographics. Many if not all of the variables are fixed items which are out of the control of the business owner.

When using the first mode where stores exist in the site being investigated, store sales (or profit; or an alternative performance measure) over some period, preferably but not necessarily a year, must be included. A measure of advertising should also be included, typically target rating points or TRPs. Often these are availablee only for "market areas," (DMA's). This is appropriate, as the advertising in a DMA affects sales for all stores in the DMA. These variables are augmented by census information available routinely. Data at the block group, tract and zip level are typically used. This data is available, for example in the commercial product MapPoint (MS), which is used, though many other mapping companies offer mapping capabilities augmented with census data. As the client desires, this data can be augmented with local business statistics available from Claritas or other sources. More detail leads to higher explanatory power in the regressions and hence better forecasts and better site selection.

With this data at hand, a DMA average sales per store for each DMA containing 4 or more stores is constructed. While four stores are used, this number can be adjusted up or down if need be. Of course, for many chains there will be many DMA's without stores and this situation is addressed in the second mode of the invention.

The next step involves a regression analysis and calculations using typical regression programs that are widely available. More specifically, the sales for each store are regressed on the assembled data including the DMA average for the sample of stores in DMA's with a reliable DMA average.

As part of the analysis, insignificant variables are dropped. This step may require some experimentation, but in general those variables showing the lowest t-statistic after regression is completed are dropped. This leaves a grouping of remaining variables, which all have t-statistics generally greater than 1.5 in absolute value works. Of course, other values could be used as the cutoff to define which variables should be considered as part of the site selection.

Once the insignificant variables are dropped, an equation for forecasting sales for sites in DMA's having stores already there is produced. In other words, sales could be predicted using the coefficients generated by the regression for each variable left-in the equation.

In the second mode of the invention, sales data is not available since the business does not have stores in the site being investigated. Therefore, all stores in the sample are used, and sales are regressed on the variable list, excluding the DMA average variable. After again selecting significant variables and dropping-insignificant variables as done for the first mode, a forecasting equation is generated that is relevant to sites in DMA's where the chain does not have accumulated experience.

The interpretation of the forecasting is done in two ways. One way involves predictions for a site on the basis of site characteristics alone. A second way involves the situation where there are already stores in the market, and their average sales are also used to predict sales at the new store.

Forecasts for either mode are reported along with the regression standard error and probabilities associated with sales intervals e.g., sales will be 1.0 to 1.25 million $/year with a probability 0.33). The interval of a year can vary, and be selected according to a client's needs.

Another important aspect of the invention is accounting for or controlling for advertising. As noted above, if advertising is not accounted for, site selection may be based, at least in part on advertising allocation and give a misleading prediction as to store performance.

Referring again to the second mode and the second regression described above wherein DMA average data is excluded, the regression includes variables for controlling the TRP or advertising allocation within the DMA. The regression uses three variables for the control; a dummy variable indicating whether the TRP allocation is zero, a variable indicating the level of TRPs, and a variable TRP-squared reflecting the non-linear effect of TRPs. The point of the specification is use of a non-linear specification for the TRPs so that its marginal effect is allowed depend on the total number of TRPs. If the effect was linear then the logical conclusion is that all advertising expenditure should be concentrated at the same place, and such would not a useful recommendation for any business.

The purpose of the suggested specification is to estimate the profitability of a site while holding constant the effects of advertising. Using the formula described above, the effect of advertising is zero up to some critical level, then positive. The formula for adjusting sales forecasts-for-incremental TRP level is: if the current TRP level at a site is zero, subtract the coefficient of the dummy variable indicating TRP zero, then add the estimated quadratic effect of the hypothesized level of TRPs. If the current level is nonzero, calculate the effect of TRPs at the current level, then subtract this amount from the calculated effect of the hypothesized TRP level. In effect, this formula is parceling out the effects of existing advertising in the sales forecast, either in situations where there is no advertising or a level of advertising at some defined level.

With the formula, one can pick hypothetical TRPs and engage in "what if" analysis with respect to the effect-on sales when the TRP is varied.

The formula is adjusted, so that "way out of sample" values are not exaggerated. In particular, negative effects at low, unobserved levels are excluded (set to zero) and effects at values greater than 1.25 times the maximum value observed in the sample are set constant at the estimated effect at 1.25. times the maximum value. The 1.25 level can be adjusted according to the client and the client's statistical sophistication.

The specification described-above is illustrated in the FIG. 1 below. Here, the observed range of TRP in the sample is a through b. The graph-shows that up to a certain point, TRP has no effect on incremental sales (the coefficients are negative or low) and is therefore zero. Then, incremental sales-increase dramatically until a certain point wherein additional TRP does not increase sales. It should be noted that the maximum value adjustment described above is reflected in the leveling off of the curve.

The specification or function is advantageous since it will allow a business owner to plug in TRPs for a site and forecast sales, independently of existing advertising effects.

With this function estimated, the "pure" profitability of a site can also be estimated, holding constant the varying effects of advertising in the sample.

This technique offers advantages over current site selection analysis. That is, it is often the case that, if a-chain is not interested in varying its advertising allocation, it decides that it is best to locate in areas where the advertising level is already high. However, this does not take into account the situation where it may be better to change the advertising allocation. Using the inventive method, a better decision can be made by considering the advertising allocation jointly with the site selection process. The inventive model allows management to consider the potential profit from opening additional stores in an area and adjusting the advertising allocation appropriately.

In practice, the presentation of the results of practicing the inventive method is preferably driven by a Visual Basic front-end program linking with, mapping software. One preferred example is MS MapPoint because it is convenient, and it has Active-X links. However, other mapping software could also be used. The front-end program could also be linked with financial performance display screen. The financial performance screen takes the sales forecasts given by the model and user-inputted site cost variables to provide multiple proforma profit and loss projections, break-even analyses, and net present value calculations (at user-chosen capitalization rates). A final observation relative to probable unit profitability will be made in this module. Default values are provided for key financial ratios using industry average values (for the restaurant industry these are assembled by Delolitte and Touche for the National Restaurant Association). It should be understood that once the sales forecast is made using the specification, any number of techniques can be used to show profitability based on the other data related to the business. Since generating a profitability in terms of a forecast of sales per year and a probability is within the skill in the art, a further description thereof is not deemed necessary for understanding of the invention.

Figure 2:
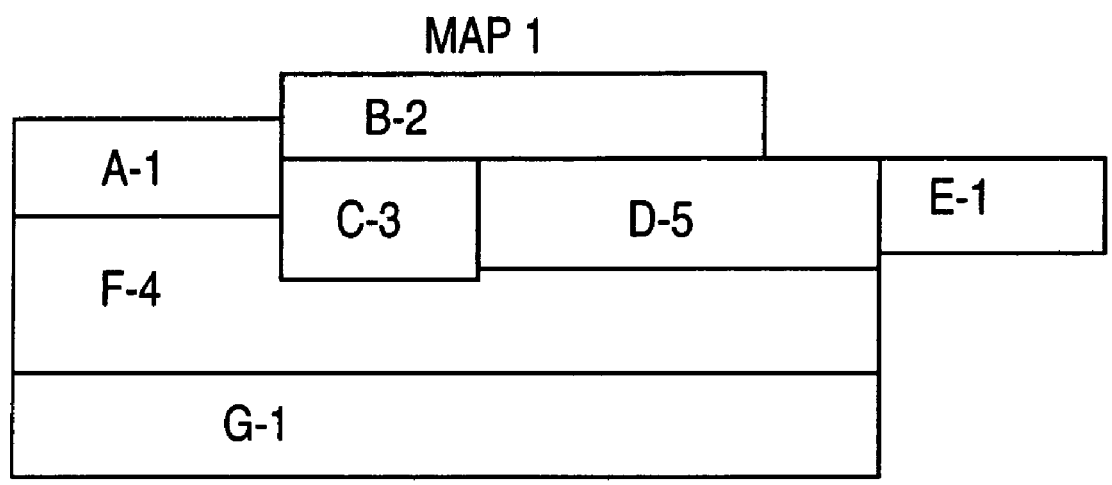
FIG. 2 is a map showing profitability of different geographic areas when advertising is held constant at a national average.
Figure 3:
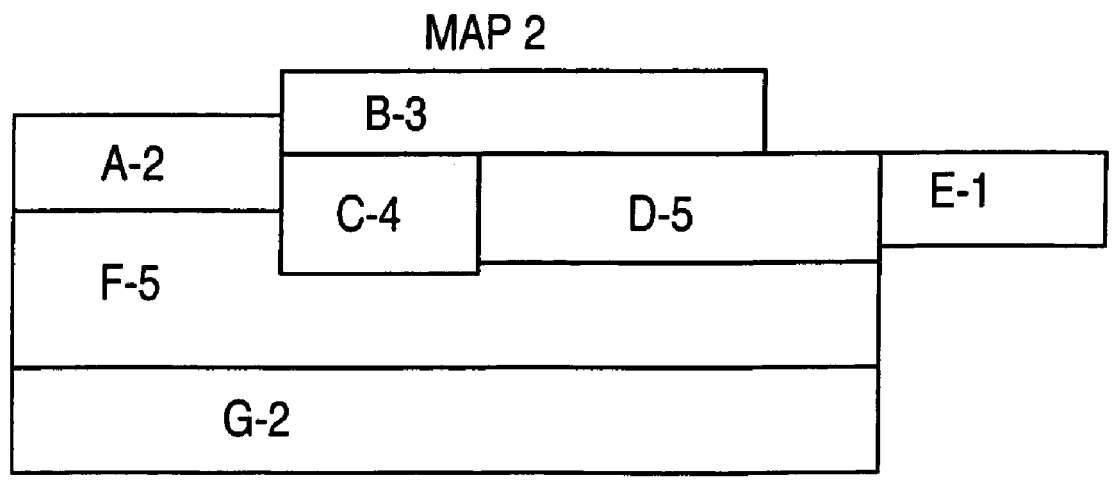
FIG. 3 is a map showing profitability of different geographic areas at actual advertising levels.

To illustrate, we show two schematic maps, Maps 1 and 2, or a hypothetical chain in FIGS. 2 and 3. Here, a number of geographical regions A-G are displayed in terms of zip codes.

The regions are rated in terms of profitability by number, with those rated 1 being the most profitable, those regions rated 2 being less profitable, and so on with the least profitable site being rated 5. The first map shows profitability when advertising is held constant at national average levels. In terms of the regression, Map 1 of FIG. 2 takes into account the site characteristics but holds the advertising constant. Using this model, any sites anywhere in the country that show the effect due to site characteristics will exhibit similar levels of profitability. This map isolates the effects of site characteristics on profitability, the site characteristics in regions A, E, and G contribute, to better profitability.

The second map in FIG. 3 shows profitability at actual advertising levels. In this example, the regression is done using actual advertising allocations rather than-the average allocation as used to generate Map 1 of FIG. 2.

Comparing the two maps of FIGS. 2 and 3, it is apparent that profitability is higher when holding advertising constant at national levels. This information would be generated using the specification and a set level of advertising for each store. Looking at Map 1 alone, the analysis identifies the high profitability areas—for site selection purposes. Map 1 says that regions numbered A, E, and G are the best candidates for site selection based on national advertising levels.

However, the invention also has the ability to look at the effects of actual advertising, which can be much more informative when making site selection. Only actual-advertising is used to determine profitability as shown in Map 2. The levels of profitability in Map 2 as compared to Map 1 drops significantly, with just region E showing a "1" rating. This indicates that the actual advertising is below the average. Map 2 also enables the identification of sites where the profitability is still high, i.e., region E, but that not many locations will be profitable at the actual levels.

To relate Map 1 to Map 2, one could perform a series of "what ifs" in terms of actual advertising and ultimately arrive at the profitability shown in Map 1 by continuing to increase the advertising until it would match the national average. Likewise, starting at an advertising allocation equivalent to the average and continually reducing the amount would result in a profitability of Map 2.

Again, Map 2 is beneficial in indicating that there are areas that need advertising input to improve profitability such as B, C, and F. Map 2 allows you to make decisions about site selection in instances where advertising-dollars can be allocated. If advertising dollars are available, then sites showing higher profitability when average advertising is used may be good candidates for increased advertising.

The two maps in comparison demonstrate that actual advertising levels are low compared to the national average and this is reflected in the profitability calculations. In addition, taking into account just actual advertising-as shown in Map 2, development in the area is less attractive with the current levels of advertising. Development would be worthwhile if additional advertising investment is made; the area looks quite attractive if additional advertising dollars can be allocated, see Map 1. This hypothetical example illustrates the importance of controlling for advertising in site evaluation.

As noted above, another advantage of the invention is that the TRP can be forecast and the regression run to determine what effects may occur, the "what if" approach. Referring again to the graph above, plugging in estimates for TRP can generate an estimate as to incremental sales, and give one an idea of where they are on the curve for purposes of advertising.

The mapping software is widely available and is only used for presenting the results of the patented method and any type available and known in the art are suitable for the invention.

Another advantage in using TRPs in the evaluation of site selection is that TRPs are in the control of the business owner whereas site characteristics are typically fixed variables. Thus, while site characteristics can be isolated to determine their relative effects on profitability, advertising can also be controlled for site selection. While restaurants have been exemplified, any type of a retail unit can be sited with the invention.

As such, an invention has been disclosed in terms of preferred embodiments thereof which fulfills each and every one of the objects of the present invention as set forth above and provides a new and improved method for site selection of retail units.

Of course, various changes, modifications and alterations from the teachings of then present invention may be contemplated by those skilled in the art without departing from the intended spirit and scope thereof. It is intended that the present invention only be limited by the terms of the appended claims.

What is claimed is:

1. A method performed by an electronic data machine for forecasting sales at potential new sites for one or more new retail units, said method comprising:

collecting a plurality of information comprising a number of variables for a number of existing sites with retail units, the variables including non-advertising variables that are specific to a number of existing retail units, a dummy variable representing no or constant advertising as target rating points, and a non-linear advertising allocation variable using target rating points as a measure of advertising, wherein the coefficient for the dummy variable and the coefficient for the non-linear advertising allocation variable are adjusted to not exceed a maximum value;

performing regression of sales for each existing site over a selected period of time on the site variables, the regression further comprising:

holding constant the effect of advertising across the existing sites during the regression by using the dummy variable and the non-linear advertising allocation variable to show the relationship between sales and the non-advertising variables independent of the effect of advertising for each existing site, wherein the regression generates coefficients for each variable;

comparing by the electronic data machine the relationship between sales and the non-advertising variables between the number of existing sites to show which existing sites based on the non-advertising variables and independent of advertising, are more profitable for site selection;

forecasting by the electronic data machine advertising-independent profitability of the potential new sites by using the coefficients determined in the regression;

ranking by the electronic data machine the potential new sites in terms of profitability based on the forecasting; and selecting one or more of the potential new sites as the new site for the new retail unit.

2. The method of claim 1, wherein a ranking is displayed on a map for each potential new site.

3. The method of claim 1, wherein profits are calculated from at least one of sales, the relationship between profits, and advertising or non-advertising variables being shown.

4. The method of claim 1, wherein an average sales figure per existing retail unit for each existing site is used as another variable in the regression.

5. A method performed by an electronic data machine for forecasting the profitability of potential new sites for a new retail unit, said method comprising:

provide a regression of information, the information comprising a plurality of variables for a plurality of existing sites with existing retail units, the variables including non-advertising variables that are specific to a number of existing retail units, a dummy variable representing no advertising or constant advertising as target rating points, and a non-linear advertising allocation variable using target rating points as a measure of advertising, wherein a coefficient for the dummy variable and a coefficient for the non-linear advertising allocation variable are adjusted to not exceed a maximum value;

regressing sales over a selected period of time using the variables for each existing site to generate coefficients for each variable using the computer, the regressing comprising holding constant the effect of advertising across the existing sites during the regressing by using the dummy variable and the non-linear advertising allocation variable to show the relationship between sales and the non-advertising variables independent of the effect of advertising for each existing site;

forecasting by the electronic data machine the advertising-independent profitability of the potential new sites by using the coefficients; and ranking by the electronic data machine the potential new sites in the order of the advertising-independent profitability forecast.

6. The method of claim 5, further comprising:
comparing the relationship between sales and the non-advertising variables of a grouping of the best performing existing sites and a grouping of the worst performing existing sites.

7. The method of claim 5, wherein the ranking is displayed on a map for each potential new site.

8. The method of claim 5, wherein profits are calculated from at least one of sales, the relationship between profits, and the advertising or non-advertising variables being shown.

9. The method of claim 5, wherein the information further comprises an average sales figure for each existing site.

10. A method performed by an electronic data machine for forecasting profits at potential new sites for one or more new retail units, said method comprising:

collecting a plurality of information, the information comprising a number of variables for a number of existing sites with retail units, the variables including non-advertising variables that are specific to a number of existing retail units, a dummy variable representing no or constant advertising as target rating points, and a non-linear advertising allocation variable using target rating points as a measure of advertising, wherein the coefficient for the dummy variable and the coefficient for the non-linear advertising allocation variable are adjusted to not exceed a maximum value;

performing regression of sales for each existing site of profits over a selected period of time on the site variables, the regressing further comprising: holding constant the effect of advertising across the existing sites during the regressing by using the dummy variable and the non-linear advertising allocation variable to show the relationship between profits and the non-advertising variables independent of the effect of advertising for each existing site, wherein the regressing generates coefficients for each variable;

comparing by the electronic data machine the relationship between profits and the non-advertising variables between the number of existing sites to show which existing sites, based on the non-advertising variables and independent of advertising, are more profitable for site selection;

forecasting by the electronic data machine advertising-independent profitability of the potential new sites by using the coefficients determined from the regression;

ranking by the electronic data machine the potential new sites in terms of profitability based on the forecasting; and selecting one or more of the potential new sites as the new site for the new retail unit.

* * * * *